(12) United States Patent  
Shim et al.

(10) Patent No.: US 9,217,884 B2  
(45) Date of Patent: Dec. 22, 2015

(54) TUNABLE PHOTONIC CRYSTAL COLOR FILTER AND COLOR IMAGE DISPLAY APPARATUS INCLUDING THE SAME

(71) Applicant: Samsung Electronics Co., Ltd., Suwon-Si, Gyeonggi-Do (KR)

(72) Inventors: Hong-shik Shim, Seoul (KR); Chang-gyun Shin, Anyang-si (KR); Seog-jin Jeon, Yongin-si (KR); Moon-gyu Han, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 86 days.

(21) Appl. No.: 13/688,481

(22) Filed: Nov. 29, 2012

(65) Prior Publication Data

US 2013/0258441 A1    Oct. 3, 2013

(30) Foreign Application Priority Data

Mar. 28, 2012 (KR) .................. 10-2012-0031820

(51) Int. Cl.  
*G02F 1/23* (2006.01)  
*G02F 1/03* (2006.01)  
*G02F 1/155* (2006.01)  
(Continued)

(52) U.S. Cl.  
CPC .................. *G02F 1/03* (2013.01); *G02F 1/155* (2013.01); *G02F 1/21* (2013.01); *B82Y 20/00* (2013.01); *G02F 2202/32* (2013.01); *G02F 2203/02* (2013.01); *G02F 2203/12* (2013.01); *Y10S 977/834* (2013.01); *Y10S 977/932* (2013.01)

(58) Field of Classification Search  
CPC ........... B82Y 20/00; G02F 1/03; G02F 1/155; G02F 1/21; G02F 2202/32; G02F 2203/02; G02F 2203/12; Y10S 977/834; Y10S 977/932  
USPC ......................................... 359/278  
See application file for complete search history.

(56) References Cited

U.S. PATENT DOCUMENTS 7,826,131 B2    11/2010 Arsenault et al.  
2009/0034051 A1*   2/2009 Arsenault et al. ............. 359/290  
(Continued)

FOREIGN PATENT DOCUMENTS

JP        2003344831 A    12/2003  
JP        2011-123238 A    6/2011

OTHER PUBLICATIONS 10-2002-0011621, Inventor: Il-Gwon Moon, Title: Light and accommodation apparatus using gand-gap control and photonic crystal display Publication date Feb. 11, 2004, KR.*  
(Continued)

*Primary Examiner* — Thomas K Pham  
*Assistant Examiner* — Vipin Patel  
(74) *Attorney, Agent, or Firm* — Harness, Dickey & Pierce, P.L.C.

(57) ABSTRACT

A tunable photonic crystal color filter and a color image display apparatus including the same. A tunable photonic crystal color filter includes a first electrode, a second electrode on the first electrode, and a medium disposed between the first electrode and the second electrode. The medium includes charged nanoparticles having a lattice structure in the medium. The first electrode and the second electrode are formed of a material having a difference between an oxidative over-potential and a reductive over-potential.

10 Claims, 5 Drawing Sheets

(51) Int. Cl.
*G02F 1/21* (2006.01)
*B82Y 20/00* (2011.01)

(56) References Cited

U.S. PATENT DOCUMENTS

2010/0012494 A1* 1/2010 Kiesele et al. ............... 204/431
2012/0050742 A1* 3/2012 Sano ............................ 356/416

OTHER PUBLICATIONS

Arsenault et al. "Photonic-crystal full-colour displays," *Nature Photonics*, vol. 1, Aug. 2007.
Lee et al. "Quasi-amorphous colloidal structures for electrically tunable full-color photonic pixels with angle-independency," *Advanced Materials*, vol. 22, 2010.

* cited by examiner

TUNABLE PHOTONIC CRYSTAL COLOR FILTER AND COLOR IMAGE DISPLAY APPARATUS INCLUDING THE SAME

CROSS-REFERENCE TO RELATED APPLICATIONS

This application claims the benefit of Korean Patent Application No. 10-2012-0031820, filed on Mar. 28, 2012, in the Korean Intellectual Property Office, the disclosure of which is incorporated herein in its entirety by reference.

BACKGROUND

1. Field

At least one example embodiment relates to a tunable photonic crystal color filter and/or a color image display apparatus including the same.

2. Description of the Related Art

A color image display apparatus generally includes an image panel that displays a gray scale of an image and a color filter that displays a color of the image.

A reflection type color image display apparatus displays colors by dividing an area of each of the pixels that constitute an image into three fixed colors and transmitting or reflecting light from the color area. In such area-divided color filters, when a primary color or a color approximating the primary color is displayed, light that is transmitted from the remaining color areas is fully blocked resulting in a large amount of color loss.

In addition, absorption type color filters that are generally used in a color image display apparatus transmit light only to a desired color area and absorb light from the remaining color areas. Thus, loss of light that occurs when light is transmitted via an absorption color filter is large in the color image display apparatus. Also, when an absorption type color filter is used in a reflection type color image display apparatus, due to characteristics of the reflection type color image panels, light passes through the absorption type color filter twice, and thus, loss of light in the absorption type color filter doubles. Accordingly, it is more difficult to display a bright color.

Thus, as an alternative to absorption type color filters, color filters using a photonic crystal whereby light is fully reflected from a color area corresponding to a photonic band gap and light in the remaining color areas is transmitted have been studied.

SUMMARY

At least one example embodiment provides a tunable photonic crystal color filter having a relatively wide range of driving voltages.

At least one example embodiment provides a color image display apparatus including the tunable photonic crystal color filter.

Additional aspects will be set forth in part in the description which follows and, in part, will be apparent from the description, or may be learned by practice of the example embodiments.

According to at least one example embodiment, a tunable photonic crystal color filter includes a first electrode; a second electrode on the first electrode; and a medium disposed between the first electrode and the second electrode, the medium including charged nanoparticles having a lattice structure in the medium, wherein the first electrode and the second electrode are formed of a material having a difference between an oxidative over-potential and a reductive over-potential.

According to at least one example embodiment, the difference between a reductive over-potential of the first electrode and an oxidative over-potential of the second electrode is within a range of about 0.1 V to about 10 V.

According to at least one example embodiment, the first electrode includes carbon.

According to at least one example embodiment, the first electrode is formed of at least one of doped diamond, diamond like carbon (DLC), and a mixture of DLC and metal nanoparticles.

According to at least one example embodiment, the doped diamond is doped with boron.

According to at least one example embodiment, the second electrode is formed of a conductive metal oxide.

According to at least one example embodiment, the second electrode is formed of at least one of $RuO_2$, $PtO_2$, $TiO_2$, and $SnO_2$.

According to at least one example embodiment, the first electrode is configured to absorb light, and the second electrode is a transparent electrode.

According to at least one example embodiment, a color image display apparatus includes a first electrode; a second electrode on the first electrode; a medium disposed between the first electrode and the second electrode, the medium including charged nanoparticles having a lattice structure in the medium, wherein a lattice interval between the nanoparticles varies according to a magnitude of a voltage applied between the first electrode and the second electrode; a circuit layer including a switching device configured to apply the voltage to the first electrode and the second electrode; and a control unit configured to control the switching device and the magnitude of the voltage, wherein the first electrode and the second electrode are formed of a material having a difference between an oxidative over-potential and a reductive over-potential.

According to at least one example embodiment, the first electrode is a cathode and the second electrode is an anode, and the difference between a reductive over-potential of the first electrode and an oxidative over-potential of the second electrode is within a range of about 0.1 V to about 10 V.

According to at least one example embodiment, the first electrode includes carbon.

According to at least one example embodiment, the first electrode is formed of at least one of doped diamond, diamond like carbon (DLC), and a mixture of DLC and metal nanoparticles.

According to at least one example embodiment, the doped diamond is doped with boron.

According to at least one example embodiment, the second electrode is formed of a conductive metal oxide.

According to at least one example embodiment, the second electrode is formed of at least one of $RuO_2$, $PtO_2$, $TiO_2$, and $SnO_2$.

According to at least one example embodiment, the first electrode is configured to absorb light, and the second electrode is a transparent electrode.

According to at least one example embodiment, the apparatus further comprises a light absorption layer under the circuit layer.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF EXAMPLE EMBODIMENTS

Figure 1:
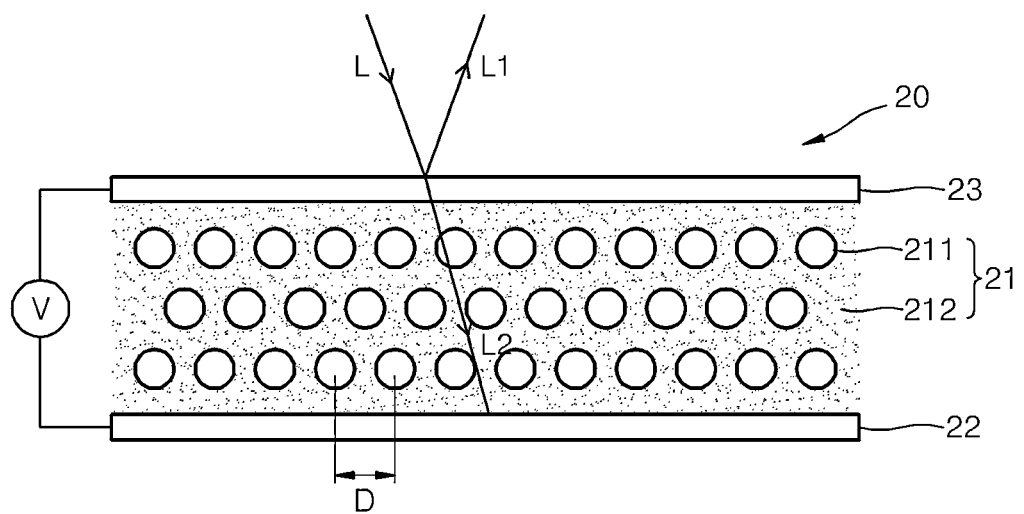
FIG. 1 schematically illustrates a tunable photonic crystal color filter according to at least one example embodiment.

Reference will now be made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "connected to" or "coupled to" another element, it can be directly on, connected or coupled to the other element or intervening elements may be present. Further, it will be understood that when a layer is referred to as being "on" another substrate or layer, the layer can be directly on a substrate or another layer, or an intervening layer may be present therebetween. In contrast, when an element is referred to as being "directly connected to", "directly on", or "directly coupled to" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the example embodiments.

The terminology used herein is for the purpose of describing particular embodiments only and is not intended to be limiting of the example embodiments. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which example embodiments below. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, a tunable photonic crystal color filter and a color image display apparatus including the same according to at least one example embodiment will be described more fully with reference to the accompanying drawings. Like numbers refer to like elements throughout, and the thicknesses of layers and regions may be exaggerated for clarity. Meanwhile, these embodiments are provided so that this disclosure will be thorough and complete, and will fully convey the inventive concepts to those skilled in the art, and the inventive concepts may be embodied in many different forms.

FIG. 1 schematically illustrates a tunable photonic crystal color filter 20 according to at least one example embodiment.

Referring to FIG. 1, the tunable photonic crystal color filter 20 includes a first electrode 22 and a second electrode 23 facing the first electrode 22. A photonic crystal layer 21 may be disposed between the first electrode 22 and the second electrode 23. The photonic crystal layer 21 may include a medium 212 including nanoparticles 211 dispersed therein. The nanoparticles 211 may be charged and dispersed in the medium 212 in a lattice structure.

A photonic crystal is an artificial crystal composed of periodically arranged materials having different dielectric constants so that a photonic band gap (PBG) is created on the energy spectrum of electromagnetic waves. Incident light on a photonic crystal passes through the photonic crystal without scattering at most wavelengths. However, a band of wavelengths (or frequencies) where light does not pass through is called a PBG. When light having a wavelength (or frequency) within the PBG enters a photonic crystal, the light is reflected rather than propagated through the photonic crystal. Since dielectric materials are periodically arranged to form a photonic crystal, a size or location of a PBG may vary depending on a refractive index and periodic structure of the dielectric materials. In the photonic crystal layer 21, the nanoparticles 211 are regularly dispersed due to electrokinetic phenomena, and thus, have a photonic crystal structure. Also, the PBG in the photonic crystal layer 21 may change according to at least one of the shape, volume, interval between nanoparticles, and refractive index of the photonic crystal due to electrical or mechanical stimulation. Thus, a bandwidth of light reflected when the PBG changes may be controlled. Accordingly, the tunable photonic crystal color filter 20 may tune color of the reflected light from external light L. For example, when the external light L is incident on the tunable photonic crystal color filter 20, light L1 of a first wavelength band may be reflected, and light L2 of the remaining wavelength band may be transmitted.

In the tunable photonic crystal color filter 20, since the nanoparticles 211 are charged, the nanoparticles 211 are affected by an electrical potential difference when a voltage is applied between the first electrode 22 and the second electrode 23. Also, when intervals between the nanoparticles 211 change, the PBG may also change. A wavelength band where light is reflected varies with the PBG of the photonic crystal layer 21, and the PBG varies with at least one of size of and intervals between the nanoparticles 211. Therefore, the size of the nanoparticles 211 may be appropriately selected according to a wavelength band where light is desired to be reflected. For example, the nanoparticles 211 may have a size of about tens to hundreds nm. As a particular example, the nanoparticles 211 may have a size of hundreds nm, for example, about 300 nm, to reflect colors in a band of visible light.

Meanwhile, the first electrode 22 and the second electrode 23 may be hetero-electrodes. The first electrode 22 and the second electrode 23 may each be formed of a material having a relatively large difference between an oxidative over-potential and a reductive over-potential. In other words, a material having a relatively large difference between an oxidative over-potential of one electrode and a reductive over-potential of another electrode may be used. For example, a difference between an oxidative over-potential and a reductive over-potential may be within a range of about 0.1 V to about 10 V. When the difference is within this range, an electric force may be induced between two electrodes, and a range of a driving voltage of a color filter may be widened by reducing the possibility of occurrence of electrolysis.

For example, the first electrode 22 may be a cathode and the second electrode 23 may be an anode. The first electrode 22 may be formed of a material having a high reductive over-potential, or the second electrode 23 may be formed of a material having a high oxidative over-potential. Alternatively, the first electrode 22 may be formed of a material having a high reductive over-potential, and the second electrode 23 may be formed of a material having a high oxidative over-potential.

For example, the first electrode 22 may be formed of a material containing carbon. For example, the first electrode 22 may be formed of doped diamond, diamond like carbon (DLC), and/or a mixture in which DLC and metal nanoparticles are mixed. The doped diamond may be doped with boron.

For example, the second electrode 23 may be formed of a conductive metal oxide. The second electrode 23 may be formed of $RuO_2$, $PtO_2$, $TiO_2$, and/or $SnO_2$.

Meanwhile, at least one of the first and second electrodes 22 and 23 may be transparent allowing light to pass through. For example, the second electrode 23 on a side where light enters may be transparent. If the second electrode 23 is formed of a conductive metal oxide, the second electrode 23 may have a satisfactory transmittance. The first electrode 22 may be transparent or opaque, and the first electrode 22 may be, for example, black to absorb transmitted light. If the first electrode 22 is black, the first electrode 22 may absorb light that passed through the photonic crystal layer 21. If the transmitted light is absorbed, another layer placed under the first electrode 22 may reduce (or alternatively, prevent) light from being reflected to the photonic crystal layer 21 again.

Next, the operating principle of the tunable photonic crystal color filter 20 will be described.

The nanoparticles 211 may have a positive charge or a negative charge and may be dispersed in the medium 212 separately from one another due to an electrostatic repulsive force. If a voltage V is applied to the first and second electrodes 22 and 23, an electric field E is formed in the medium 212. Here, the nanoparticles 211 including an electric double layer shift in the medium 212 in one direction toward one of the first and second electrodes 22 and 23. For example, the nanoparticles 211 shift in parallel to the electrostatic repulsive force forming a lattice structure by being uniformly dispersed and being arranged with a regular lattice interval D therebetween.

The photonic crystal layer 21 including the lattice structure has a PBG where light having a desired (or alternatively, predetermined) wavelength may be blocked or transmitted due to periodic distribution of refractive indices. According to Bragg's law, light having a desired (or alternatively, predetermined) wavelength λ that is expressed by the following Equation 1 may not be transmitted through the photonic crystal layer 21 and is reflected therefrom:

$$m\lambda = 2nD \cdot \sin\theta \qquad \text{<Equation 1>}$$

Here, λ is a wavelength of diffracted or reflected light, n is an effective refractive index of the photonic crystal layer 21, D is a lattice interval between the nanoparticles 211 of the photonic crystal layer 21, and θ is an incident angle of the light. Also, m is an integer.

If the magnitude of the voltage V applied to the first and the second electrodes 22 and 23 is changed, then the parallel state of the nanoparticles 211 with the electrostatic repulsive force is changed, and thus, the lattice interval D of the nanoparticles 211 may be changed. Therefore, the wavelength λ of the reflected light L1 may be controlled by controlling the voltage V applied to the first and the second electrodes 22 and 23. For example, as the applied voltage V is increased, a wavelength band of the light L1 reflected from the photonic crystal layer 21 may gradually decrease to shorter wavelengths.

Meanwhile, characteristics of the photonic crystal layer according to a type of a medium will be described hereinafter. If a medium is formed of an organic solvent in which charged nanoparticles are dispersed, uniformity of the lattice structure may not be maintained as charges of the nanoparticles weaken due to characteristics of an organic solvent. Therefore, a peak of a reflection spectrum may be fuzzy, and thus, a color may be degraded as a result. Also, if the charged nanoparticles are dispersed in an aqueous solution, a peak of a reflection spectrum may be sharp as surface charges of the nanoparticles are strong due to characteristics of an aqueous solution. However, if a voltage is applied to an electrode to form an electric field, a lattice structure may destabilize when a quantity of electric charges of nanoparticles or an electric field in a medium changes due to occurrence of electrolysis in an aqueous solution. Thus, a range of a driving voltage of a photonic crystal layer is limited to a range in which electrolysis in an aqueous solution does not occur, and reliability of the photonic crystal layer may decrease as the lattice structure becomes unstable. However, according to an example embodiment, the first and the second electrodes 22 and 23 are formed of a material having a relatively large difference between an oxidative over-potential and a reductive over-potential at which electrolysis of the medium occurs, and thus, a range of a voltage applied to the photonic crystal layer may be widened. Accordingly, effective color conversion is enabled, and reliability of a color filter may be improved.

Electrolysis of water and decomposition of organic solvent occur by transfer of electrons between electrodes and an electrolyte. However, the electron transfer may be inhibited in an electrode material having a high over-potential since a charge transfer resistance is great at the same potential. For example, in an electrode made of a carbon material, the electron transfer occurs easily in the case of a graphite electrode having an $sp^2$ structure due to a great amount of free electrons, while a diamond electrode having a $sp^a$ structure has a relatively large over-potential since free electrons are not present, and thus, a voltage at which electrolysis occurs is higher than that for the graphite electrode. Depending on the type of electrode, a material having a high over-potential, where $O_2$ is generated during the electrolysis, and a material having a high reductive over-potential, where $H_2$ is generated during the electrolysis, are included in each of the electrodes, and thus, a range of the electrical field applied to the photonic crystal layer may be widened by combining the electrode materials. That is, a range of a driving voltage of the photonic crystal layer may be widened by using electrode materials which inhibit the electron transfer between the electrode and the electrolyte.

Figure 2:
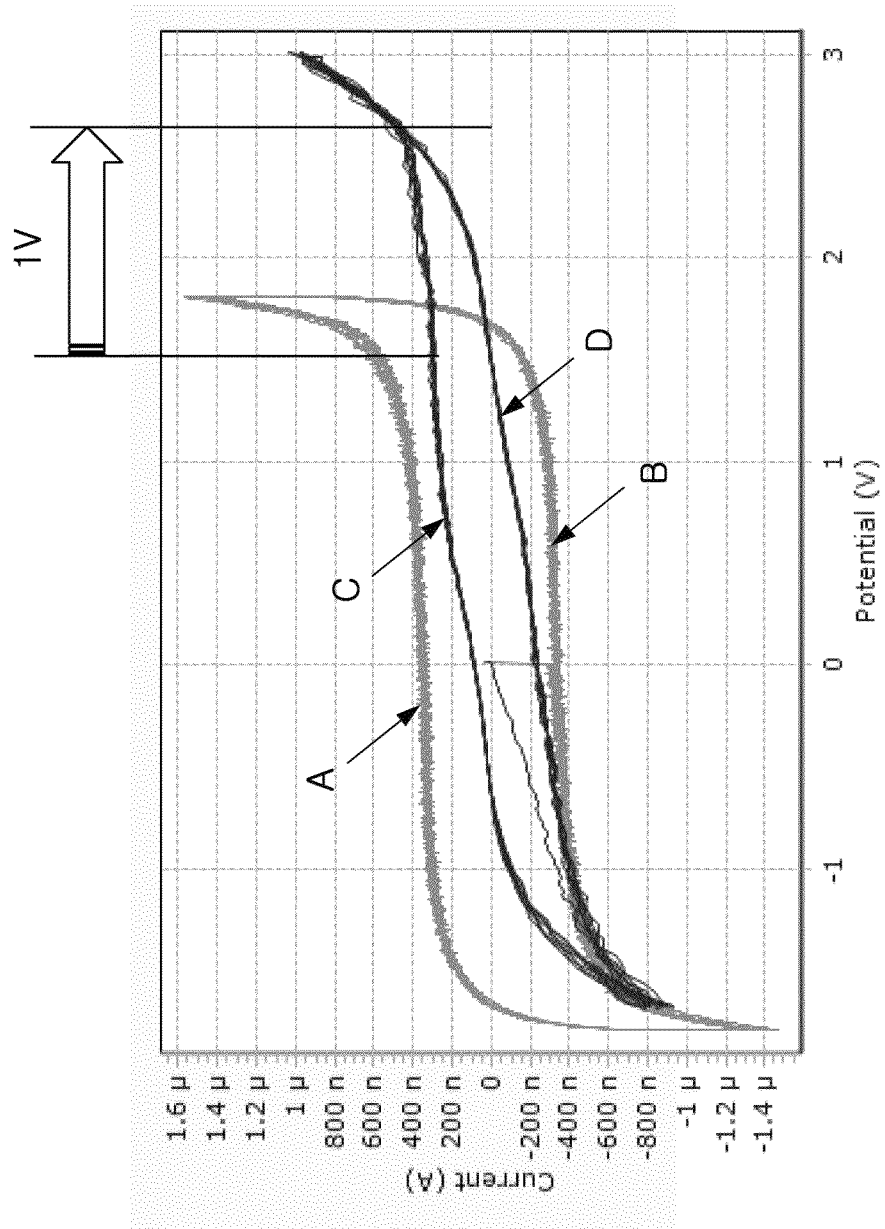
FIG. 2 is a graph of current vs. voltage of a color filter according to a comparative embodiment and a tunable photonic crystal color filter according to at least one example embodiment.

FIG. 2 illustrates a change in current according to a potential varying with a structure of an electrode. A voltage point where the constant current drops or increases is the voltage where electrolysis occurs. A and B illustrate a change in current according to a potential in a comparative embodiment where both of first and second electrodes are formed of an ITO electrode. C and D illustrate a change in current according to a voltage in the current embodiment where a cathode (e.g., a first electrode) is formed of a mixture, in which DLC is mixed with Ti nanoparticles, and an anode (e.g., a second electrode) is formed of an ITO electrode. FIG. 2 shows that a voltage at which electrolysis of water starts increases by about 1 V in an example embodiment compared to the comparative embodiment.

Figure 3:
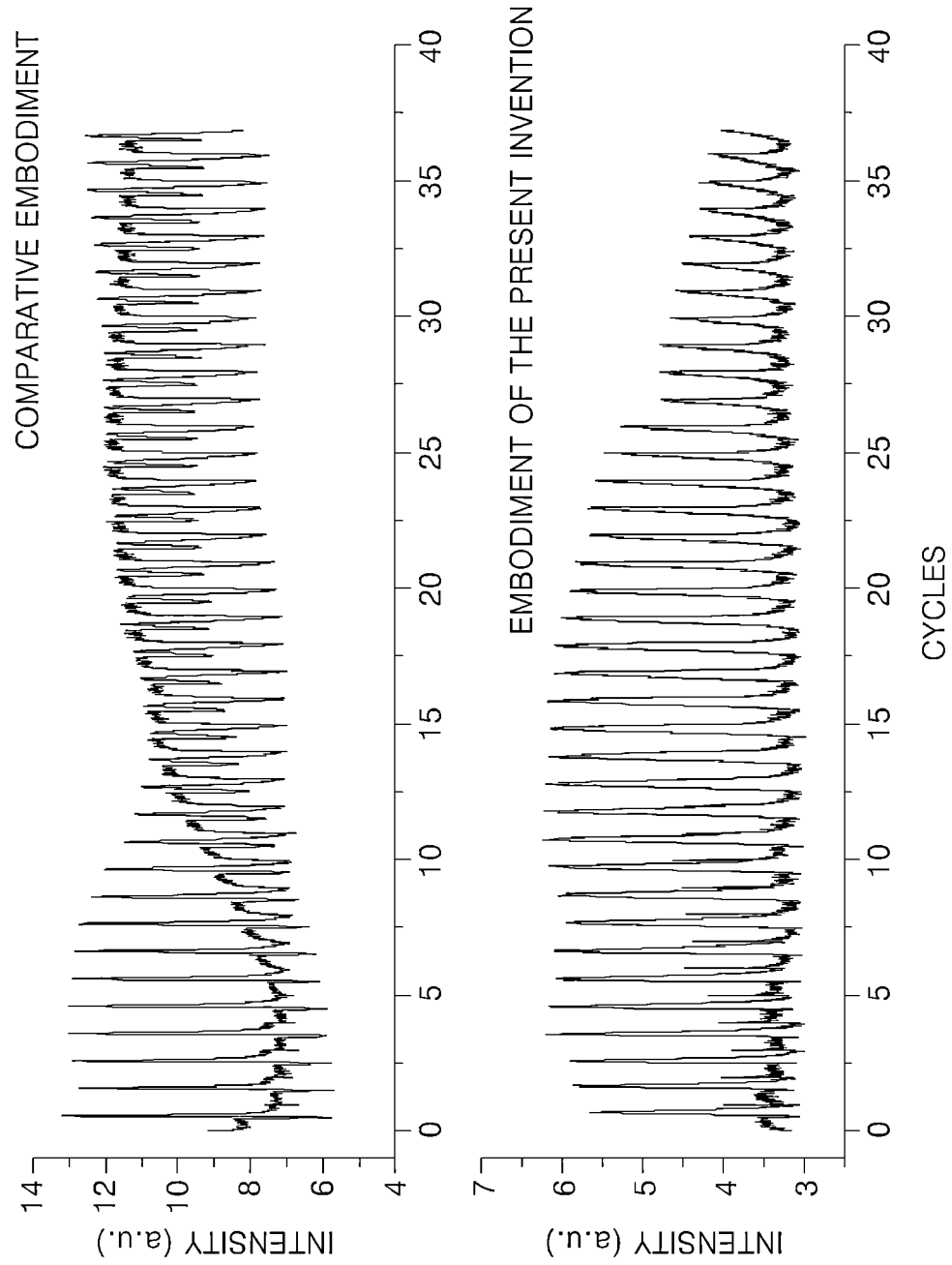
FIG. 3 illustrates a graph of light intensity vs. driving cycles of a color filter according to a comparative embodiment and a tunable photonic crystal color filter according to at least one example embodiment.

FIG. 3 illustrates a change in intensity of reflected light at a wavelength of 550 nm according to a number of driving cycles when a color filter is driven while repeating switching between 0 V to 3.2 V. For example, a comparative embodiment shows that a decrease in peak intensity occurs after fewer driving cycles compared to an example embodiment. The decrease in peak intensity occurs because the photonic crystal layer becomes damaged by electrolysis of water as a voltage higher than the voltage causing electrolysis is applied. For example, when comparing peak intensities of light at the wavelength of 550 nm, a decrease in peak intensity of the example embodiment using the ITO and DLC electrodes is slower than in the comparative embodiment where the ITO and ITO electrodes are used. For example, the peak intensity decreased after about 5 driving cycles in the comparative embodiment, and the peak intensity decreased after about 18 driving cycles in the example embodiment. Accordingly, a photonic crystal color filter formed according to an example embodiment has improved reliability.

A range of a driving voltage of a color filter may be widened by forming an electrode from a material that allows a voltage with a relatively high magnitude at which electrolysis or decomposition occurs to be applied thereto. Thus, a color band of reflected light may be widened, and reliability of the color filter may be improved.

Figure 4:
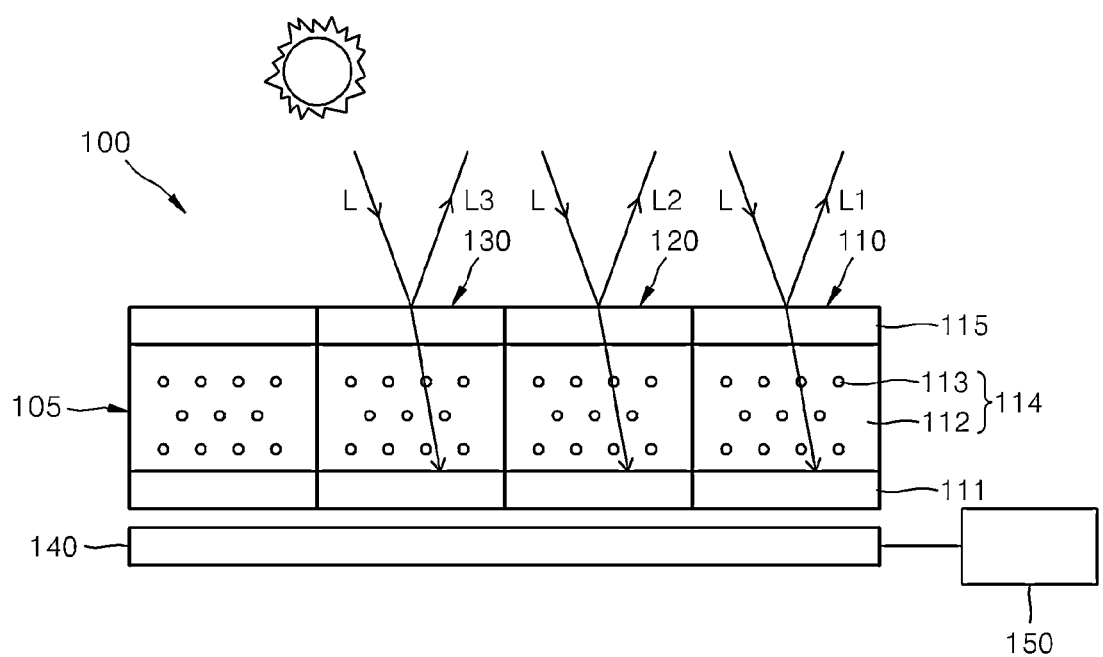
FIG. 4 schematically illustrates a color image display apparatus according to at least one example embodiment.

FIG. 4 schematically illustrates a color image display apparatus 100 according to at least one example embodiment.

The color image display apparatus 100 may include a tunable photonic crystal color filter 105, a circuit layer 140, and a control unit 150. The circuit layer 140 includes a switching device, which applies a voltage to the tunable photonic crystal color filter 105. The control unit 150 controls the switching device and a magnitude of the voltage. The tunable photonic crystal color filter 105 may include of a plurality of pixels, which are independently controlled.

The tunable photonic crystal color filter 105 may include a first electrode 111, a second electrode 115 facing the first electrode 111, and a photonic crystal layer 114 disposed between the first electrode 111 and the second electrode 115. The photonic crystal layer 114 may include a medium 112 and nanoparticles 113 dispersed in the medium 112. The nanoparticles 113 may be dispersed in a lattice structure and may be charged. A lattice interval between the nanoparticles 113 may be changed according to a magnitude of the voltage between the first electrode 111 and the second electrode 115.

The first electrode 111 and the second electrode 115 may be hetero-electrodes. The first electrode 111 and the second electrode 115 may each be formed of a material having a relatively large difference between an oxidative over-potential and a reductive over-potential. For example, the first electrode 111 may be a cathode, and the second electrode 115 may be an anode. The first electrode 111 may be formed of a material having a high reductive over-potential, and the second electrode 115 may be formed of a material having a high oxidative over-potential. Alternatively, the first electrode 111 may be formed of a material having a high reductive over-potential, and the second electrode 115 may be formed of a material having a high oxidative over-potential.

For example, the first electrode 111 may be formed of a material containing carbon. For example, the first electrode 111 may be formed of doped diamond, diamond like carbon (DLC), or a mixture in which DLC and metal nanoparticles are mixed. The doped diamond may be doped with boron.

For example, the second electrode 115 may be formed of a conductive metal oxide. The second electrode 115 may be formed of $RuO_2$, $PtO_2$, $TiO_2$, or $SnO_2$.

The switching device that applies voltage to the first electrode 111 and the second electrode 115 may be, for example, a TFT device. The switching device may independently operate such that a desired voltage is applied to each of the pixels. Meanwhile, the pixels of the first electrode 111 are insulated from each other, and the second electrode 115 is formed as a common electrode.

Referring to FIG. 4, the operation of the color image display apparatus 100 will be described. The color image display apparatus 100 may include a first pixel 110, a second pixel 120, and a third pixel 130. The control unit 150 may apply a voltage to each of the pixels by driving the switching device of the circuit layer 140 according to an image signal. For example, light L1 of a first wavelength from the external light L which is incident on the first pixel 110 may be reflected when a first voltage is applied to the first pixel 110, and thus, light of the remaining wavelengths may be transmitted. Light L2 of a second wavelength from the external light L which is incident on the second pixel 120 may be reflected when a second voltage is applied to the second pixel 120, and thus, light of the remaining wavelengths may be transmitted. Light L3 of a third wavelength from the external light L which is incident on the third pixel 130 may be reflected when a third voltage is applied to the third pixel 130, and thus, light of the remaining wavelengths may be transmitted. Thus, a color image may be displayed by reflecting light of a desired (or alternatively, predetermined) wavelength from each pixel.

The tunable photonic crystal color filter 105 is formed of a material that allows a voltage with a relatively high magnitude at which electrolysis or decomposition occurs to be applied thereto, and thus, a range of a driving voltage may be widened. Thus, a quality of a color image may be high since a range of a color that may be tuned is wide when the tunable photonic crystal color filter 105 is used. Further, reliability of the apparatus may be improved even after the apparatus is repeatedly driven.

Figure 5:
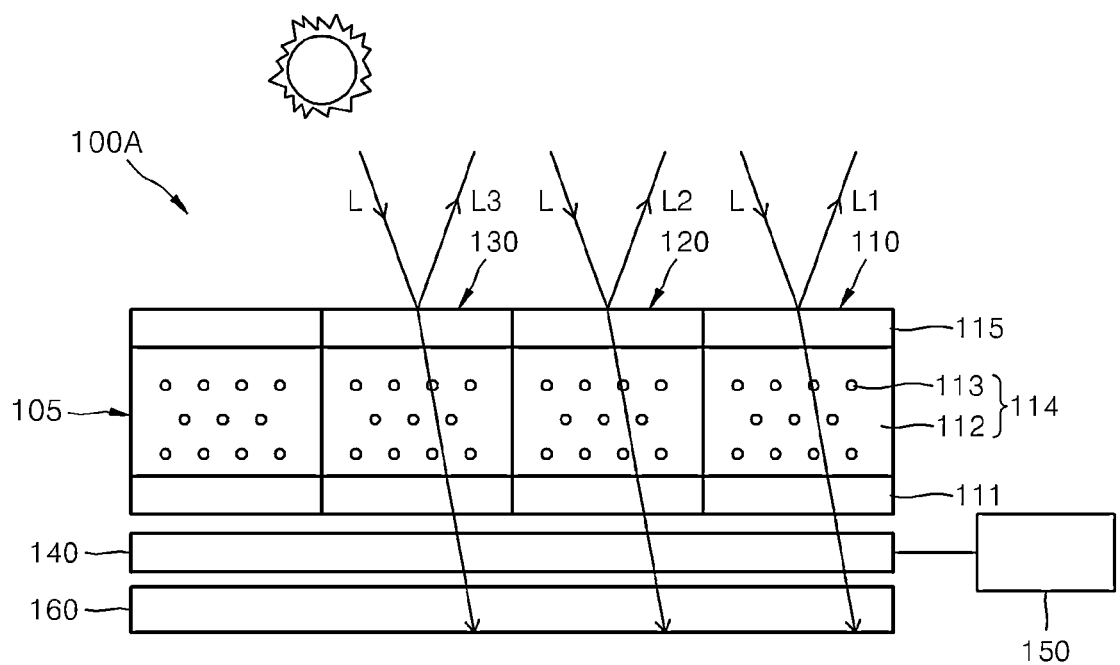
FIG. 5 illustrates a color image display apparatus according to at least one example embodiment.

FIG. 5 illustrates a color image display apparatus 100A according to at least one example embodiment. Compared with FIG. 4, the color image display apparatus 100A further includes a light absorption layer 160 under the circuit layer 140. The tunable photonic crystal color filter 105 only reflects light of a desired (or alternatively, predetermined) color according to a structure of the photonic crystal layer 114 and transmits light of other colors. Here, in order to reduce (or alternatively, prevent) transmitted light from being reflected by other devices or layers and transmitted out again and affecting an image, the light absorption layer 160 is disposed under the circuit layer 140 to absorb the transmitted light. Therefore, a color image with better quality may be provided.

As described above, a tunable photonic crystal color filter according to the one or more of the above example embodiments may widen a range of a tunable color by using a wide range of a driving voltage, thereby widening a range of a color to be displayed. Also, as a range of the driving voltage is widened, the reliability of the color filter may be improved. Moreover, the tunable photonic crystal color filter according to at least one example embodiment has a high light efficiency, and thus, when used in a reflection type color image display apparatus, a clear color image may be displayed when external light is applied thereto.

It should be understood that the tunable photonic crystal color filter and the color image display apparatus including the same should be considered in a descriptive sense only and not for purposes of limitation. Descriptions of features or aspects within each example embodiment should typically be considered as available for other similar features or aspects in other example embodiments.

What is claimed is:

1. A tunable photonic crystal color filter, comprising:
   a first electrode;
   a second electrode on the first electrode; and
   a medium disposed between the first electrode and the second electrode, the medium including charged nanoparticles having a lattice structure in the medium, wherein
   the first electrode and the second electrode are formed of a material having a difference between an oxidative over-potential and a reductive over-potential,
   the difference between the reductive over-potential of the first electrode and the oxidative over-potential of the second electrode is within a range of about 0.1 V to about 10 V such that occurrence of electrolysis in the medium is suppressed, and
   the first electrode is formed of diamond doped with boron.

2. The tunable photonic crystal color filter of claim 1, wherein the second electrode is formed of a conductive metal oxide.

3. The tunable photonic crystal color filter of claim 2, wherein the second electrode is formed of at least one of $RuO_2$, $PtO_2$, $TiO_2$, and $SnO_2$.

4. The tunable photonic crystal color filter of claim 1, wherein the first electrode is configured to absorb light, and the second electrode is a transparent electrode.

5. The tunable photonic crystal color filter of claim 1,
   wherein a driving voltage applied to the first and second electrodes is smaller than the difference between the reductive over-potential of the first electrode and the oxidative over-potential of the second electrode such that occurrence of electrolysis according to oxidation and reduction in the medium is suppressed.

6. A color image display apparatus, comprising:
   a first electrode;
   a second electrode on the first electrode;
   a medium disposed between the first electrode and the second electrode, the medium including charged nanoparticles having a lattice structure in the medium, wherein a lattice interval between the nanoparticles varies according to a magnitude of a voltage applied between the first electrode and the second electrode;
   a circuit layer including a switching device configured to apply the voltage to the first electrode and the second electrode; and
   a control unit configured to control the switching device and the magnitude of the voltage, wherein
   the first electrode and the second electrode are formed of a material having a difference between an oxidative over-potential and a reductive over-potential, and
   the difference between the reductive over-potential of the first electrode and the oxidative over-potential of the second electrode is within a range of about 0.1 V to about 10 V such that occurrence of electrolysis in the medium is suppressed, and
   wherein the first electrode is formed of diamond doped with boron.

7. The apparatus of claim 6, wherein the second electrode is formed of a conductive metal oxide.

8. The apparatus of claim 7, wherein the second electrode is formed of at least one of $RuO_2$, $PtO_2$, $TiO_2$, and $SnO_2$.

9. The apparatus of claim 6, wherein the first electrode is configured to absorb light, and the second electrode is a transparent electrode.

10. The apparatus of claim 6, further comprising:
    a light absorption layer under the circuit layer.

* * * * *